(12) United States Patent
Jalmasco et al.

(10) Patent No.: US 11,202,459 B2
(45) Date of Patent: Dec. 21, 2021

(54) METHOD FOR PROCESSING FAT-BASED FLAVOUR CONCENTRATE

(71) Applicant: NESTEC S.A., Vevey (CH)

(72) Inventors: Cecilia Jalmasco, Singapore (SG);
Joselio Batista Vieira, York (GB);
John Newell, Brent (CH); Josef Kerler, Bern (CH)

(73) Assignee: Societe des Produits Nestle S.A., Vevey (CH)

(*) Notice: Subject to any disclaimer, the term of this patent is extended or adjusted under 35 U.S.C. 154(b) by 95 days.

(21) Appl. No.: 16/332,095

(22) PCT Filed: Sep. 12, 2017

(86) PCT No.: PCT/EP2017/072817
§ 371 (c)(1),
(2) Date: Mar. 11, 2019

(87) PCT Pub. No.: WO2018/050615
PCT Pub. Date: Mar. 22, 2018

(65) Prior Publication Data
US 2019/0364942 A1    Dec. 5, 2019

(30) Foreign Application Priority Data
Sep. 16, 2016 (EP) .................................. 16189231

(51) Int. Cl.
*A23L 27/21* (2016.01)
*A23L 27/20* (2016.01)
*A23L 2/56* (2006.01)

(52) U.S. Cl.
CPC .............. *A23L 27/215* (2016.08); *A23L 2/56* (2013.01); *A23L 27/206* (2016.08); *A23V 2002/00* (2013.01)

(58) Field of Classification Search
CPC ........ A23L 27/215; A23L 2/56; A23L 27/206; A23L 29/00; A23L 29/015; A23V 2002/00
See application file for complete search history.

(56) References Cited

U.S. PATENT DOCUMENTS 5,676,993 A    10/1997  Watterson et al.
2018/0042279 A1*  2/2018  Kerler .................. A23L 27/206

FOREIGN PATENT DOCUMENTS

RU    2116034 C1    7/1993
RU    2269909 C2    2/2006
(Continued)

OTHER PUBLICATIONS

Russia Patent Office Communication for Application No. 2019111194, dated Jan. 21, 2021, 11 pages.

*Primary Examiner* — Subbalakshmi Prakash
(74) *Attorney, Agent, or Firm* — K&L Gates LLP

(57) ABSTRACT

The present invention relates to a method for preparing a fat-based flavour concentrate, comprising the following steps: (i) providing a fat/oil base ranging from 40 to 75% w/w and further providing a flavour precursor composition comprising at least one added polyol, at least one added amino compound, at least a dairy ingredient, and at least a particulate processing aid, wherein the ratio of the dairy ingredient to the particulate processing aid is from 1:1 to 4:1 (measured as w/w); (ii) continuous thermal processing of the flavour precursor composition with particulate processing aid suspended in the fat/oil base to generate a fat-based flavour concentrate, wherein heating step is performed in a continuous oil phase at a low moisture content ranging from 0 to 5% added water; and (iii) cooling the fat-based flavour concentrate.

11 Claims, 2 Drawing Sheets

(56) References Cited

FOREIGN PATENT DOCUMENTS

| WO | 0249452 | 6/2002 |
|----|---------|--------|
| WO | 2009011598 | 1/2009 |

\* cited by examiner

METHOD FOR PROCESSING FAT-BASED FLAVOUR CONCENTRATE

CROSS REFERENCE TO RELATED APPLICATIONS

The present application is a National Stage of International Application No. PCT/EP2017/072817, filed on Sep. 12, 2017, which claims priority to European Application No. 16189231.0, filed on Sep. 16, 2016, the entire contents of which are being incorporated herein by reference.

FIELD OF THE INVENTION

The present invention relates to fat-based flavour concentrates and in particular to improving the efficiency for processing fat-based flavour concentrates based on milk powder-in-oil suspensions subjected to continuous thermal process, i.e., the suspension is in continuous fluid motion, undergoing heat treatment.

BACKGROUND OF THE INVENTION

It is known in the art that fat based systems, i.e. using melted fat in which ingredients/precursors are dispersed, can be used to generate flavours. State of the art methods are mainly based on heating of fat, often milk fat, together with reducing sugars, proteins and alkaline catalysts in anhydrous or low moisture systems.

Where the precursors for such flavour generation process in fat based systems comprise a dairy ingredient, such as skim milk powder or buttermilk powder, it is observed that the milk particles tend to form lumps or masses in the fat during the heat treatment. This is often described as aggregation.

Currently, aggregation is believed to be caused by the release of water due to the crystallization of lactose during heat treatment. This release of water, potentially in combination with moisture generated through the Maillard reaction, enforces aggregation of the milk particles in oil. This is supported by the observation that when precursors such as reducing sugars and amino acids are added in dissolved form (i.e. introducing additional water) into the milk solids-oil mass, the aggregation of milk solids is enhanced as compared to dry addition of precursors.

While aggregation of milk particles in oil may be useful, for example in the preparation of tablets from powders, it is undesired if the goal is to produce a free flowing suspension. For example, in continuous thermal processes such as in heat exchangers where such a suspension may be pumped, the aggregation of dairy ingredients undesirably increases viscosity, making pumping more difficult and sometimes leading to blockages and damage to heat exchangers and line fouling. Milk aggregates are heavy particles that do not remain suspended in the fat-based system, leading to settling in the pipes and eventual blockages. In these instances, preventing or disrupting the aggregation of milk particles during heat treatment in an oil phase is desirable.

Emulsifiers have been used to reduce viscosity increases in other food matrices containing oil. For example, EP0577379 relates to the use of an emulsifier, and desirably a hydrophilic colloid suspended in liquid vegetable oil, in small amounts enables cooling of fat-containing sauces to less than 55° F. without experiencing problems of fat solidification, equipment fouling or undue viscosity increases. Preferably, lecithin is added to a fat phase of the sauce in an amount of from 0.1 to 0.3%, xanthan gum added at a level of 0.005 to 0.2%, and the liquid vegetable oil will be at a level from 0.2% to 4.2%.

The object of the present invention is to provide an improved method for preparing fat-based flavour concentrates based on milk powder-in-oil suspensions, which enable longer heat treatment periods and reduced problems associated with milk powder aggregation.

SUMMARY OF THE INVENTION

Accordingly, the present invention provides a method for preparing a fat-based flavour concentrate, comprising the following steps:
providing a fat/oil base ranging from 40 to 75% w/w and further providing a flavour precursor composition comprising at least one added polyol, at least one added amino compound, at least a dairy ingredient, and at least a particulate processing aid, wherein the ratio of the dairy ingredient to the particulate processing aid is from 1:1 to 4:1 (measured as w/w);
continuous thermal processing of the flavour precursor composition with particulate processing aid suspended in the fat/oil base to generate a fat-based flavour concentrate wherein heating step is performed in a continuous oil phase at a low moisture content ranging from 0 to 5% added water; and
cooling the fat-based flavour concentrate.

The present inventors have shown that the aggregation of the dairy ingredients in the fat base can be avoided if inert particulate processing aids are added to the milk particle suspension prior to the heat treatment. The flavour precursor composition is combined with an inert particulate processing aid in a ratio of from 1:1 to 4:1 (measured as w/w). Absence of the particulate processing aid or the ratio out of the defined range of 1:1 to 4:1 have been shown to be ineffective against milk aggregation and thus lead to blockages of heat exchanger lines.

The addition of particulate processing aids reduces suspension viscosity at the temperatures necessary for the Maillard reaction to occur, facilitating the pumping of the suspension through heat exchangers. The processing aids by maintaining particle size of the solids at around 200 microns (D90 value) prevent aggregates from sedimentation inside the pipes, thus avoiding blockages.

The process described in the present invention was particularly effective if the particulate processing aid used in the fat-based flavour concentrate was calcium carbonate, preferably precipitated calcium carbonate, which has more uniform and regular particle distribution.

DETAILED DESCRIPTION OF THE INVENTION

Figure 1:
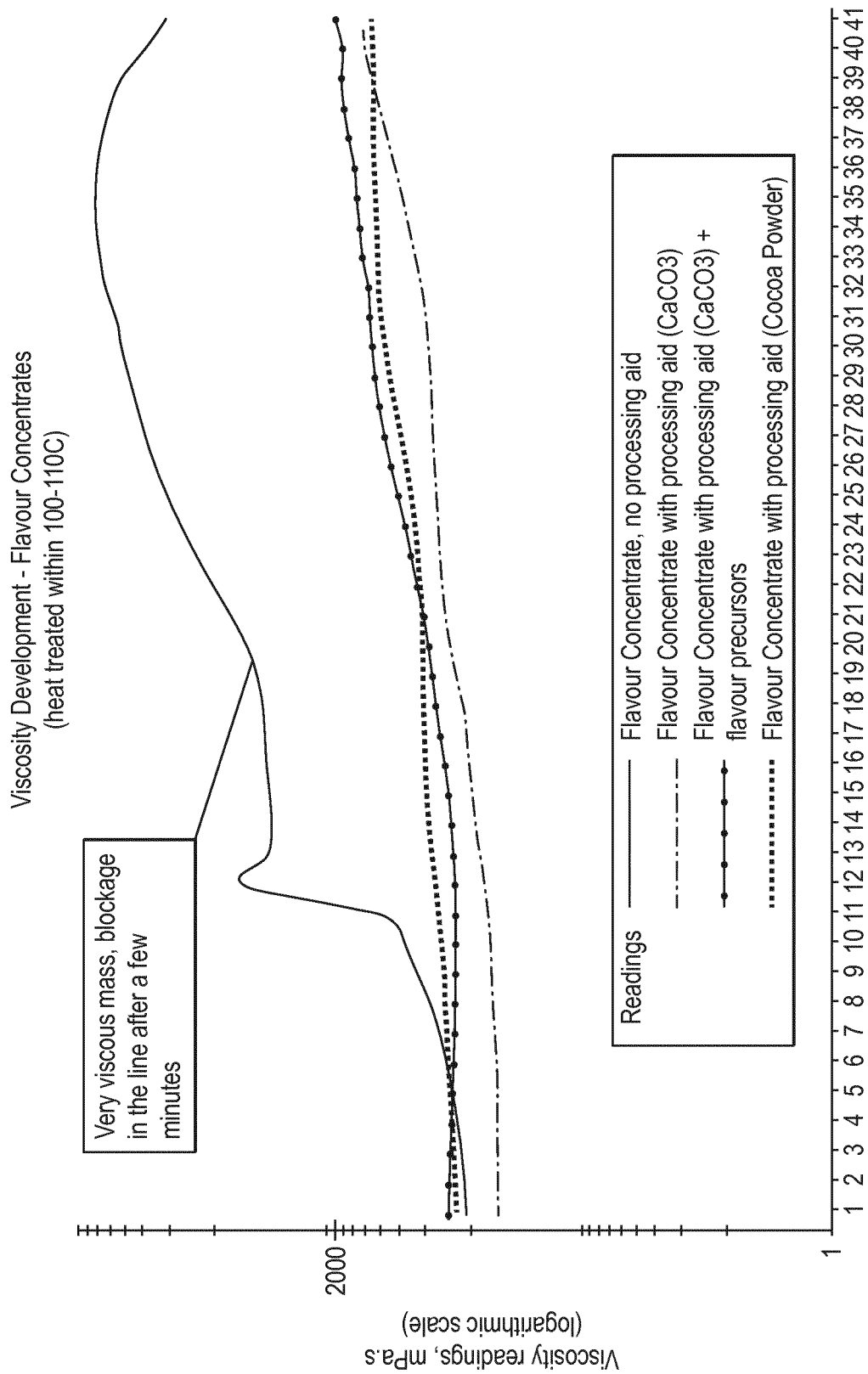
FIG. 1 depicts viscosity profiles of the fat-based flavour concentrates produced with and without the particulate processing aid. Example 1 is such a recipe without any processing aid, while the concentrates with processing aids (calcium carbonate and cocoa powder) were prepared under conditions described in Examples 3 and 4.

Consequently, the present invention provides a method for preparing a fat-based flavour concentrate, comprising the following steps:
- providing a fat base ranging from 40 to 75% w/w and further providing a flavour precursor composition comprising at least one added polyol, at least one added amino compound, at least a dairy ingredient, and at least a particulate processing aid, wherein the ratio of the flavour precursor composition to the particulate processing aid is from 1:1 to 4:1 (w/w);
- heating the flavour precursor composition with particulate processing aid suspended in the fat base to generate a fat-based flavour concentrate, wherein heating step is performed in a continuous oil phase at a low moisture content ranging from 0 to 5% added water; and
- cooling the fat-based flavour concentrate.

The term "Continuous thermal processing" is defined as a flow production method used to manufacture, produce, or process materials without interruption. Continuous production is referred to as a 'continuous flow process' or a 'continuous thermal process' because the materials, either dry bulk or fluids that are being processed are continuously in motion, undergoing chemical reactions or subject to mechanical or heat treatment. Continuous (thermal) processing is contrasted with batch processing.

The term 'continuous oil phase' refers to a continuous process wherein the matrix consists of solids or fluids suspended or dispersed in oil, with oil being most abundant ingredient/matrix component in the recipe (ca. 50-75% of matrix is oil). Oil acts as carrier in which heat transfer and chemical (Maillard) reactions occur.

The term 'particulate processing aid' refer to compounds such as calcium salts, micronized coffee, and/or cocoa particles which aid in processing of dairy ingredients present in the system. For example, calcium carbonate helps in processing the mass of milk solids in oil matrix by preventing aggregation of the milk solids.

The inventors surprisingly found that the use of particulate processing aids which are inert (e.g. calcium-based minerals) in specific ratios from 1:1 to 4:1 (w/w) can prevent aggregation of heat treated milk particles in a continuous oil phase.

It is believed that these particulate processing aids of regular and very small particle size are easily dispersed in the oil phase and embed themselves in between hydrophilic milk particles, thus preventing aggregation. The materials used in the continuous thermal process are chosen depending on the desired final product attributes.

The term 'micronized' refers to the particle size of the processing aid, as measured by D90, which should be less than 80 µm, more preferably less than 50 µm. Examples of such materials include minerals, micronized roasted coffee beans and cocoa (e.g. micronized cocoa powder, cocoa liquor).

The term 'inert' refers to the particulate processing aid does not take part in any chemical reactions during its processing, and keeps its ability to 'disrupt' or prevent aggregation.

Examples of particulate processing aid that can be used according to the continuous thermal process of the present invention include minerals, cocoa powder, cocoa liquor, and ground coffee particles. Particularly preferred is calcium carbonate.

Micronized calcium carbonate can be provided in two forms: precipitated calcium carbonate (PCC) and ground calcium carbonate (GCC). PCC's shape and size are different from that of GCC. The distribution of particle sizes in a GCC is much broader than for a PCC of the same size—that is, there are more large particles and many more small particles than in a PCC, and the size of the largest of the particles (the "top size") is much greater for a GCC than for a PCC. The lower top size of a PCC gives better impact resistance in plastics than with a GCC. The narrower particle size distribution allows the generation of high oil absorptions, useful in certain applications. In One embodiment of the present invention, the particulate processing aid is Precipitated calcium carbonate (providing neutral sensory impact on final application).

The oil suspension can optionally include other ingredients such as emulsifiers (e.g. lecithin). Addition of lecithin to the premix appears to synergistically work with the processing aids to reduce aggregation of milk powder.

In the present invention, 'fat-based' or in particular 'fat-based flavour concentrates' refers to a ingredient composed of a fat/oil phase in which material components such as milk ingredients and sugars/amino acids are dispersed and which also contains flavour providing molecules derived from thermal processing by Maillard reaction.

Any fat can be used in the process of the present invention as long as it is heat stable. Exemplary fats include, without limitation and in their low moisture form if applicable, fractionated palm kernel oil, cocoa butter, anhydrous milk fat (AMF), coconut oil, hydrogenated vegetable oil such as soy fat or cottonseed oil, and combinations thereof. The fat/oil serves as a continuous phase and its level ranges from 20 to 98%, preferably from 35 to 55%, even more preferably from 40 to 50%.

Any dairy ingredient is suitable for use in the present invention as long as it has low moisture content. Examples of such dairy ingredients include, without limitation, non-fat dry milk (i.e. skim milk powder), sweet buttermilk powder, demineralized whey powder, whey permeate, whole milk powder and combinations thereof. Dairy ingredient levels can range from 1 to 60% (% of solid content of flavour concentrate premix), preferably from 30 to 55%, more preferably from 40-55%.

'Flavour precursors' mean any ingredient such as amino acids or reducing sugars that can participate in a Maillard reaction.

The amino acids used for the present invention can be any amino acid. In one embodiment there is at least one amino compound comprises glycine, alanine, valine, norvaline, leucine, norleucine, aspartic acid, glutamic acid, asparagine, glutamine, arginine, lysine, serine, threonine, proline, tyrosine, cysteine, cystine, methionine, phenylalanine, histidine, tryptophan, dihydroxyphenylalanine, taurin, thiamine, carnosine and mixtures of these. In another embodiment the amino acid is pro line or lysine. The preferred use levels (% of solid content of flavour concentrate premix) of these amino acids range from 0.25 to 2.5% for proline and 0.5 to 5% for lysine.

In one embodiment the process of present invention uses at least one polyol comprising glycerol; sorbitol; glucuronic acid; 5-keto-gluconic acid; galacturonic acid; iduronic acid; maltodextrin; glucose syrup; rhamnose; xylose; glucose; fructose; sucrose; lactose; maltose, xylitol, maltitol, erythritol, mannitol and mixtures of these.

The reducing sugar used for the reaction step can be any mono—or disaccharide. Examples of reducing sugars are lactose, maltose, dextrose, fructose, rhamnose, fucose, xylose, arabinose, and combinations thereof. Preferably, the reactive sugar used in our embodiments is rhamnose and/or xylose in the range up to 5% (% of solid content of flavour concentrate premix, preferably in the range below 1%).

'Thermal treatment' or 'Heat treatment' means any suitable process to generate the flavour concentrates. This can include batch cooking or the use of heat exchangers in case of continuous thermal processing.

The signature flavour is generated by heating the dairy ingredient/precursor mix in a continuous oil phase, preferably using hydrogenated palm kernel oil (HPKO), at a low to very low moisture content (<0 to 5% added water). Process conditions involve a temperature range from 90 to 160° C., preferably around 110-125° C., with a residence time ranging between 5 to 30 min, preferably around 10-20 min.

The dairy ingredient/precursor mix is either suspended in the continuous oil phase without any water addition, or the amino acid/sugar mix is pre-dissolved in water together with disodium hydrogen phosphate to allow to dose this aqueous mix in a concentrated form into the suspension of dairy ingredient in oil, i.e. keeping water content in the recipe at a very low level (at 5% or lower, preferably lower than 3%). Alternatively, the amino acid/sugar mix can be added in dry format, followed by addition of low amounts of water together with pre-dissolved disodium hydrogen phosphate.

In one embodiment, the present invention relates to a continuous thermal process according to the present invention wherein the precursor composition is either suspended in the continuous oil phase without any water addition; or the amino acid/sugar mix is pre-dissolved in water together with disodium phosphate to allow to dose this aqueous mix in a concentrated form into the suspension of dairy ingredient in oil, i.e. keeping water content in recipe at a very low level (at 5% or lower, preferably lower than 3%); or the amino acid/sugar mix can be added in dry format, followed by addition of low amounts of water together with pre-dissolved disodium hydrogen phosphate.

A fat-based flavour concentrate obtainable by the process of the invention, as provided in any of the above-described embodiments is an object of the present invention.

The invention also provides in another embodiment a food product or a beverage comprising a fat-based flavour concentrate obtainable by the process of the invention. Such food product or beverage may be obtained by admixing the flavour concentrate with the other ingredient of the product matrix or by preparing the flavour concentrate in situ in the product. The latter option is particularly advantageous in beverage applications, such as creamers, coffee mixes, cocoa and malt beverages. The food product or beverage may be in liquid or powdered form.

In an embodiment the food product or beverage is a dairy product or a food product comprising a dairy component. Examples of dairy products include milk products, such as evaporated milks culinary creams or whipped creams, yogurts, dairy desserts, dairy-based nutritional compositions such as compositions specially adapted to children or elderly people, tea or coffee creamers or enhancers, dairy components in coffee mixes and dairy components for use in a beverage system such as a beverage vending system, as well as dairy-based soups, sauces or snacks. Such dairy products may comprise a large variety of ingredients, such as fibres, cereals, fruits, vegetables, probiotics and any kind of suitable micro-nutrient such as vitamins and minerals.

Example 1

A fat-based flavour concentrate was prepared by continuous thermal processing of the following recipe:

TABLE 1

| Ingredients | % w/w |
|---|---|
| Hydrogenated palm kernel oil | 50.00 |
| Skimmed milk powder | 44.60 |
| Lysine | 2.28 |
| Proline | 1.44 |
| Rhamnose | 0.95 |
| Lecithin | 0.48 |
| Disodium phosphate | 0.25 |

The suspension of skim milk powder, single amino acids, rhamnose, lecithin and disodium phosphate in hydrogenated palm kernel oil was pumped through a backpressure valve using the nominal 220 kg/hr flowrate. The initial processing set points were 100° C., 220 kg/hr and 1500 mbarg backpressure. The processing temperature was then raised slowly to 110° C., 115° C. and finally 120° C. After around 70 minutes at 120° C. a blockage occurred.

Example 2

A fat-based flavour concentrate was prepared by continuous thermal processing of the following recipe:

TABLE 2

| Ingredients | % w/w |
|---|---|
| Hydrogenated palm kernel oil | 73.325 |
| Skimmed milk powder | 19.684 |
| Lysine | 0.228 |
| Proline | 0.722 |
| Rhamnose | 0.256 |
| Lecithin | 0.488 |
| Disodium phosphate | 0.140 |
| Calcium carbonate | 4.922 |

The suspension of skim milk powder, single amino acids, rhamnose, lecithin and disodium phosphate plus micronized calcium carbonate in hydrogenated palm kernel oil was pumped of through a backpressure valve using the nominal 220 kg/hr flowrate, processed at temperatures from 100 to 125° C. for 20 minutes at 1500-3000 mbarg. The process sustainably ran in a stable manner across these process conditions, i.e., without any incidence of blockages or evidence of aggregates sedimenting in the pipes.

Example 3

A fat-based flavour concentrate was prepared by continuous thermal processing of the following recipe:

TABLE 3

| Ingredients | % w/w |
|---|---|
| Hydrogenated palm kernel oil | 48.769 |
| Skimmed milk powder | 39.330 |
| Lysine | 0.228 |
| Proline | 0.721 |
| Rhamnose | 0.256 |
| Lecithin | 0.488 |
| Disodium phosphate | 0.140 |
| Calcium carbonate | 9.832 |

The suspension of skim milk powder, single amino acids, rhamnose, lecithin and disodium phosphate plus micronized calcium carbonate in hydrogenated palm kernel oil was pumped through a backpressure valve using the nominal 220 kg/hr flowrate, processed at temperatures from 100 to 125° C. for 20 minutes at 1500-3000 mbarg. The process sustainably ran in a stable manner across these process conditions, i.e., without any incidence of blockages or evidence of aggregates sedimenting in the pipes.

Example 4

A fat-based flavour concentrate was prepared by continuous thermal processing of the following recipe:

TABLE 4

| Ingredients | % w/w |
| --- | --- |
| Hydrogenated palm kernel oil | 49.131 |
| Skimmed milk powder | 39.526 |
| Proline | 0.614 |
| Rhamnose | 0.436 |
| Lecithin | 0.490 |
| Disodium phosphate | 0.119 |
| Micronized coffee | 9.684 |

The suspension of skim milk powder, proline, rhamnose, lecithin and disodium phosphate plus micronized coffee in hydrogenated palm kernel oil was pumped through a backpressure valve using the nominal 220 kg/hr flowrate, processed at temperatures from 100 to 125° C. for 20 minutes at 1500-3000 mbarg. The process sustainably ran in a stable manner across these process conditions, i.e., without any incidence of blockages or evidence of aggregates sedimenting in the pipes.

Example 5

A fat-based flavour concentrate was prepared by continuous thermal processing of the following recipe:

TABLE 5

| Ingredients | % w/w |
| --- | --- |
| Hydrogenated palm kernel oil | 47.775 |
| Skimmed milk powder | 41.678 |
| Lysine | 1.501 |
| Lecithin | 0.476 |
| Disodium phosphate | 0.122 |
| Calcium carbonate | 4.727 |

The suspension of skim milk powder, lysine, lecithin and disodium phosphate plus micronized calcium carbonate in hydrogenated palm kernel oil was pumped through a backpressure valve using the nominal 220 kg/hr flowrate, processed at temperatures from 100 to 125 C at 1500 mbarg. The process ran for a few minutes before feed and backpressures began to rise and eventually the system blocked.

Figure 2:
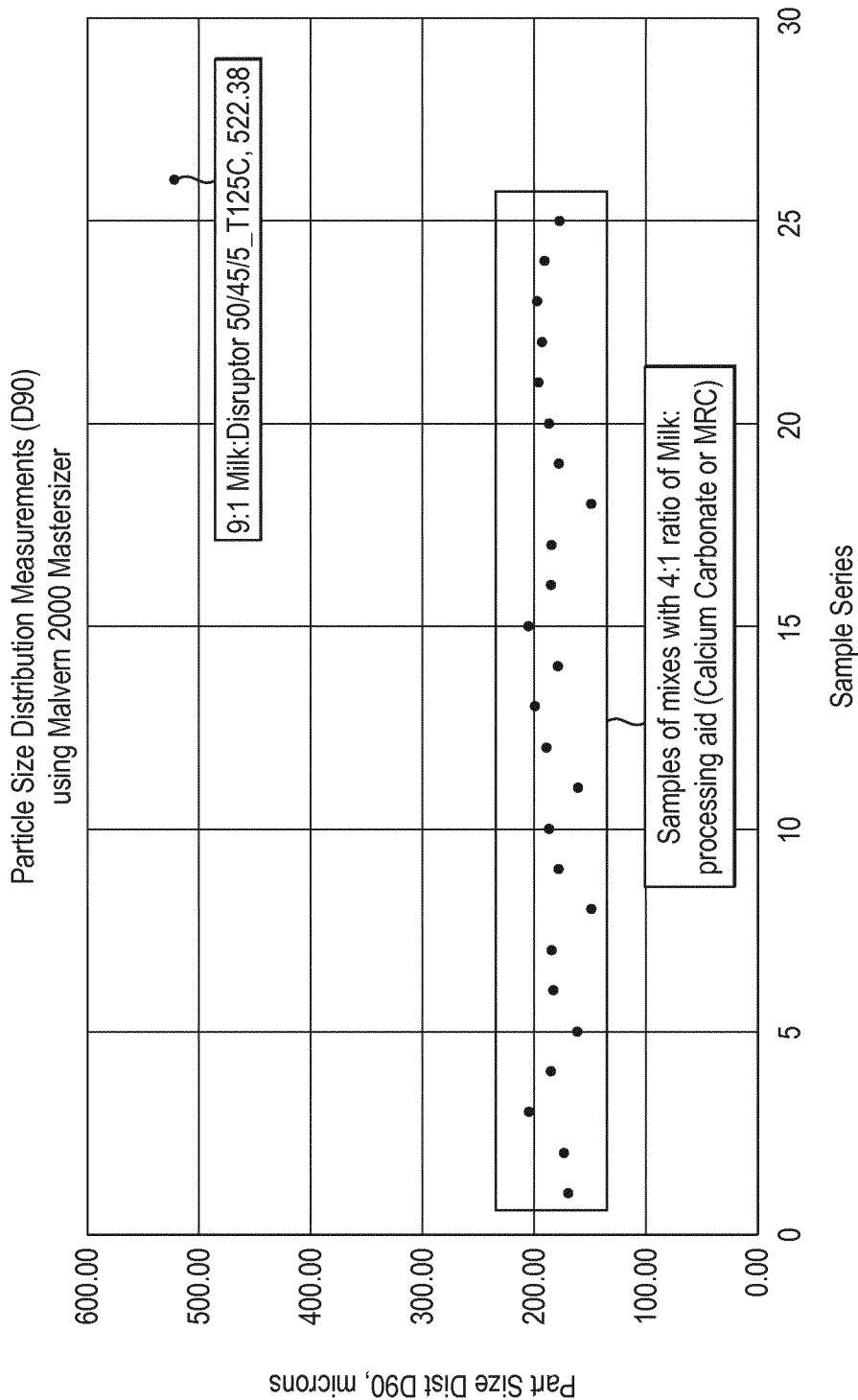
FIG. 2 shows Particle size distribution of fat-based suspensions, in particular the particle size distribution of samples with 4:1 (w/w) flavour precursor composition (Examples 3-4): particulate processing aid ratio vs. 9:1 (w/w) flavour precursor composition (Example 5): particulate processing aid ratio.

The particle size of the fat-based flavour concentrates from examples 3, 4 and 5 were measured by laser diffraction (Mastersizer 2000 Hydro 2000S, Instrument, UK). The flavour concentrate samples were heated at 60° C. until these changed from solid to liquid state. The samples were dispersed in sunflower oil until the obscuration level is within 10-18%. To measure the particle size, a refractive index (RI) of 1.47 for the dispersing medium (sunflower oil) and 1.52 for the flavour concentrate was used. Pump/stir speed was set at 2500 rpm, and two measurements were taken per aliquot. Results are reported as the mass division diameter D90 (see FIG. 2).

The invention claimed is:

1. A method for preparing a fat-based flavor concentrate, comprising:
providing a fat/oil base ranging from 40 to 75% w/w of the fat-based flavor concentrate and further providing a flavor precursor composition comprising at least one added reducing sugar, at least one added amino compound, at least one dairy ingredient, and at least one particulate processing aid comprising a component selected from the group consisting of calcium carbonate, micronized coffee, cocoa particles, and mixtures thereof,
wherein the ratio of the at least one dairy ingredient to the at least one particulate processing aid is from 1:1 to 4:1 measured as w/w,
wherein the at least one added amino compound is selected from the group consisting of glycine, alanine, valine, norvaline, leucine, norleucine, aspartic acid, glutamic acid, asparagine, glutamine, arginine, lysine, serine, threonine, proline, tyrosine, cysteine, cystine, methionine, phenylalanine, histidine, tryptophan, dihydroxyphenylalanine, taurine, thiamine, carnosine and mixtures of these, and
wherein the water content of the flavor precursor composition is no greater than 5 wt. %;
continuous thermal processing of the flavor precursor composition suspended in the fat/oil base to generate the fat-based flavor concentrate, wherein the continuous thermal processing is performed in a continuous oil phase at the water content of no greater than 5 wt. %,
wherein the continuous thermal processing is performed at a temperature ranging from 90 to 160° C. with a residence time ranging from 5 to 30 min; and
cooling the fat-based flavor concentrate.

2. The method of claim 1, wherein the fat/oil base comprises an oil selected from the group consisting of fractionated palm kernel oil, hydrogenated palm kernel oil, cocoa butter, anhydrous milk fat (AMF), hydrogenated vegetable oil, cottonseed oil, and combinations thereof.

3. The method of claim 2, wherein the fat/oil base comprises hydrogenated palm kernel oil.

4. The method of claim 1 wherein the at least one reducing sugar is selected from the group consisting of glucuronic acid, 5-keto-gluconic acid, galacturonic acid, iduronic acid, maltodextrin, glucose syrup, rhamnose, xylose, glucose, fructose, lactose, maltose and mixtures of these.

5. The method of claim 1 wherein the flavour precursor composition comprises an alkali or acid.

6. The method of claim 1 wherein the at least one reducing sugar is selected from the group consisting of rhamnose, xylose, fructose and combinations of these, and the at least one amino compound is selected from the group consisting of proline, arginine, glycine, lysine and combinations of these.

7. The method of claim 1 wherein the at least one reducing sugar is rhamnose and/or xylose and wherein the at least one amino compound is proline or lysine.

8. The method of claim 1 wherein the at least one dairy ingredient is selected from the group consisting of skim milk powder, buttermilk powder, whey powder and mixtures thereof.

9. The method of claim 1, wherein the method comprises mixing the at least one particulate processing aid with an aqueous creamer component to form an oil-in-water emulsion.

10. The method of claim 1, wherein the continuous thermal processing is performed at a temperature ranging from 110 to 125° C.

11. The method of claim 1, wherein the continuous thermal processing is performed with a residence time ranging from 10 to 12 min.

* * * * *